(12) United States Patent
Hommel (10) Patent No.: US 12,534,938 B2
(45) Date of Patent: Jan. 27, 2026

(54) JOINT BAR ARRANGEMENT FOR A JOINT BAR LOCK AND A JOINT BAR LOCK

(71) Applicant: ABUS August Bremicker Söhne KG, Wetter-Volmarstein (DE)

(72) Inventor: Martin Hommel, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 64 days.

(21) Appl. No.: 18/610,347

(22) Filed: Mar. 20, 2024

(65) Prior Publication Data

US 2024/0337136 A1    Oct. 10, 2024

(30) Foreign Application Priority Data

Apr. 6, 2023    (DE) .......................... 102023108957.9

(51) Int. Cl.
*E05B 67/00* (2006.01)
(52) U.S. Cl.
CPC .................................. *E05B 67/003* (2013.01)
(58) Field of Classification Search
CPC ...... E05B 67/003; E05B 73/001; E05B 73/00; Y10T 70/40; Y10T 70/411; Y10T 70/435; Y10T 70/483
(Continued)

(56) References Cited

U.S. PATENT DOCUMENTS

| | | | |
|---|---|---|---|
| 6,820,448 B1 | 11/2004 | Hsieh | |
| 7,311,233 B2 * | 12/2007 | Chen | B62J 11/00 224/935 |

(Continued)

FOREIGN PATENT DOCUMENTS

| | | | | |
|---|---|---|---|---|
| CA | 2638047 A1 * | 1/2009 | ........... | E05B 67/003 |
| DE | 202005021411 U1 | 1/2008 | | |

(Continued)

OTHER PUBLICATIONS

Catalogue "Specialized—Bicycles & Equipment Spring 2003" (title page and p. 27).

*Primary Examiner* — Suzanne L Barrett
(74) *Attorney, Agent, or Firm* — Dickinson Wright PLLC (57) ABSTRACT

A joint bar arrangement for a joint bar lock comprises a plurality of joint bars connected to one another in series according to a defined sequence, including a first joint bar and a last joint bar according to the sequence, each extending along a longitudinal extent from a first end section to a second end section, and each joint bar, with the exception of the last joint bar, is coupled with its second end section via a respective joint connection to the first end section of the subsequent joint bar according to the sequence, in such a way that it can be pivoted relative to the subsequent joint bar about a joint axis of the respective joint connection which is orthogonal to its longitudinal extent. Each of the joint bars is bound with respect to a transverse extent, orthogonal to its longitudinal extent and to the joint axis of the respective joint connection, by two opposite longitudinal sides which are thickened, at least in sections, namely, at least insofar as it is not the first joint bar, in the entire first end section of the respective joint bar and, at least insofar as it is not the last joint bar, in the entire second end section of the respective joint bar, the longitudinal sides are thickened insofar that they have a greater expanse in a direction parallel to the joint axis of the respective joint connection than an in-between central region of the respective joint bar.

20 Claims, 3 Drawing Sheets

(58) Field of Classification Search
USPC .................................................. 70/14, 30, 49
See application file for complete search history.

(56) References Cited

U.S. PATENT DOCUMENTS

| | | | | |
|---|---|---|---|---|
| 7,437,898 | B2* | 10/2008 | Su | E05B 67/003 |
| | | | | 70/423 |
| 7,481,084 | B1 | 1/2009 | Wu | |
| 8,156,772 | B2 | 4/2012 | Buhl et al. | |
| 8,418,513 | B2 | 4/2013 | Buhl et al. | |
| 8,555,682 | B2* | 10/2013 | Trunek | E05B 71/00 |
| | | | | 70/30 |
| 8,881,599 | B2 | 11/2014 | Ganser | |
| 8,904,831 | B2* | 12/2014 | Stevens | E05B 67/003 |
| | | | | 70/53 |
| 10,017,965 | B2* | 7/2018 | Wang | E05B 67/28 |
| 10,766,553 | B2* | 9/2020 | Shenkerman | B62H 5/001 |
| 10,946,914 | B2* | 3/2021 | Schachter | B62H 5/003 |
| 2016/0369531 | A1* | 12/2016 | Hommel | B62J 11/00 |
| 2020/0370334 | A1* | 11/2020 | Drechsel | E05B 37/02 |
| 2024/0337138 | A1* | 10/2024 | Hommel | E05B 71/00 |

FOREIGN PATENT DOCUMENTS

| | | | | | |
|---|---|---|---|---|---|
| DE | 102009030036 | A1 | | 12/2010 | |
| DE | 202014102326 | U1 | | 7/2014 | |
| DE | 102019001224 | A1 | | 8/2020 | |
| DE | 102019113378 | A1 | | 11/2020 | |
| DE | 202019105979 | U1 | | 1/2021 | |
| DE | 102019123477 | A1 | * | 3/2021 | ............ E05B 71/00 |
| EP | 1413699 | A1 | * | 4/2004 | ............ E05B 71/00 |
| FR | 2503077 | A1 | | 10/1982 | |
| JP | 2018-145587 | A | | 9/2018 | |
| WO | 2023217448 | A1 | | 11/2023 | |

\* cited by examiner

JOINT BAR ARRANGEMENT FOR A JOINT BAR LOCK AND A JOINT BAR LOCK

CROSS-REFERENCE TO RELATED APPLICATION

This application claims the benefit and priority of German Patent Application No. 102023108957.9 filed on Apr. 6, 2023. The entire disclosure of the above application is incorporated herein by reference.

FIELD

The invention relates to a joint bar arrangement for a joint bar lock and a joint bar lock having such a joint bar arrangement.

BACKGROUND OF THE INVENTION

Locks which are configured as joint bar locks, instead of a single rigid hoop, a chain or the like, are known, i.e. as a locking element they have a joint bar arrangement comprising a plurality of joint bars pivotally connected to one another which can be locked, for example, at a lock body of the lock in order to close the lock. Such a joint bar arrangement can be folded together relatively compact, but at the same time it is comparatively highly secure due to the rigid joint bars. However, it is also important for the security of the joint bar lock that the joint connections between the joint bars as potential weak points of the joint bar arrangement, are reliably secured against being broken-open.

At the same time, especially if the joint bar lock is configured and used as a two-wheeler joint bar lock, it is desirable to keep the weight as low as possible so that the joint bar lock can be carried around easily. Although a decrease in weight may be achieved by reducing the material used for the joint bar arrangement, this is often accompanied by a reduction in the stability of the joint bars and thus in the breaking-open protection of the joint bar lock.

SUMMARY OF THE INVENTION

It is a task of the invention to provide a joint bar arrangement for a joint bar lock, and a joint bar lock having such a joint bar arrangement, which offers a high level of security, in particular against being broken-open at the joint connections, while at the same time requiring comparatively less material and is made comparatively lightweight.

This task is solved by a joint bar arrangement having the features of claim 1 and by a joint bar lock having the features of claim 9. Advantageous embodiments of the invention may be taken from the dependent claims, the description and the figures.

According to the invention, the joint bar arrangement for a joint bar lock, in particular for a two-wheeler joint bar lock, comprises a plurality of joint bars serially connected to one another according to a defined sequence, including, according to the sequence, a first joint bar and a last joint bar. The sequence thus extends from the first joint bar to the last joint bar and preferably comprises a plurality of further joint bars in-between. However, this does not exclude the possibility that the first joint bar is preceded by further joint bars and/or that the last joint bar is followed by further joint bars, but which are then not considered as part of the joint bar arrangement.

In particular, the first joint bar may be a so-called housing bar, with which the joint bar arrangement is permanently mounted to a lock housing of a lock body of the respective joint bar lock. The first joint bar is therefore preferably configured to be permanently mounted to a lock housing of a lock body of the respective joint bar lock. In particular, the last joint bar may be a so-called locking bar which can be locked to the lock body of the respective joint bar lock, i.e. it may be selectively disposed at the lock body so that it is secured against being released from the lock body, or however, it may be released again from the lock body. Consequently, the last joint bar is preferably formed to be selectively locked to the lock body of the respective joint bar lock.

The joint bars are preferably rigid, bar-shaped elements, whose material may in particular be of a metal that is preferably hardened. Furthermore, the joint bars are preferably each made as a single-piece, whereby a plastic coating may be disregarded. The joint bars may be formed straight.

According to the invention, each of the joint bars extends along a longitudinal extent from a first end section to a second end section. The longitudinal extent is not in a fixed spatial direction, but relates to the respective joint bar and is therefore not oriented in the same direction as for all joint bars, but is dependent on the current orientation of the respective joint bar relative to the other joint bars. The first end section and the second end section are each a partial section of the longitudinal extent which comprises a respective one of the two ends of the longitudinal extent. The end sections each have a certain expanse along the longitudinal extent, i.e. they do not only include the respective end of the longitudinal extent. Generally, the first end section and the second end section of a respective joint bar may extend so far along the longitudinal extent that they adjoin each other, approximately in the center of the longitudinal extent. However, the respective joint bar may also even have further sections between the two end sections.

According to the invention, each of the joint bars, with the exception of the last joint bar according to the sequence, is coupled by its second end section via a respective joint connection to the first end section of the subsequent joint bar according to the sequence. Accordingly, the reverse also applies, in that each of the joint bars, with the exception of the first joint bar according to the sequence, is coupled by its first end section via a respective joint connection to the second end section of the joint bar preceding it according to the sequence. The coupling of the respective joint bar with the joint bar following or preceding it, is such that the respective joint bar is pivotable relative to the joint bar following or preceding it, about a joint axis of the respective joint connection that is orthogonal to its longitudinal extent. The joint axis is preferably orthogonal not only to the longitudinal extent of the respective joint bar, but also to the longitudinal extent of the subsequent or preceding joint bar. Furthermore, it is preferable if the joint axes of all the joint connections coupling the joint bars of the joint bar arrangement to one another are parallel to one another.

Furthermore, according to the invention, it is provided for, that each of the joint bars of the joint bar arrangement is bound by two opposite longitudinal sides with respect to a transverse extent orthogonal to its longitudinal extent and to the joint axis of the respective joint connection (i.e. the joint connection which couples the respective joint bar with the joint bar following or preceding it according to the sequence). The longitudinal sides preferably extend over the entire longitudinal extent of the respective joint bar. Furthermore, the longitudinal sides may have a straight contour and/or be oriented parallel to each other, in particular parallel to the longitudinal direction of the respective joint bar. The joint bars may therefore have a constant width (i.e. a constant expanse parallel to the transverse extent).

According to the invention, the two longitudinal sides are thickened, at least in sections. In particular, the two longitudinal sides are at least thickened in the entire first end section of the respective joint bar when the respective joint bar is not the first joint bar, and are at least thickened in the entire second end section of the respective joint bar when the respective joint bar is not the last joint bar. As a result, the two longitudinal sides are therefore thickened at least where a respective joint connection couples together two joint bars of the joint bar arrangement. Preferably, the two longitudinal sides are thickened throughout the entire longitudinal extent of the respective joint bar.

The longitudinal sides are thickened insofar as they (within the respective section of the longitudinal extent in which they are thickened) have a greater expanse in a direction parallel to the joint axis of the respective joint connection, than an in-between central region of the respective joint bar. The central region which is thus reduced in thickness compared to the thickened longitudinal sides, extends in particular with an at least substantially constant thickness (i.e. a constant expanse orthogonal to the longitudinal extent and to the transverse extent), preferably over the entire longitudinal extent of the respective joint bar. Furthermore, the central region preferably has a constant width (i.e. a constant expanse parallel to the transverse extent).

In particular, the joint axis of the respective joint connection may extend through this central region. For example, it may be provided for, that at each joint connection which couples a respective joint bar to a subsequent joint bar according to the sequence, the joint axis of the respective joint connection extends in the region of the second end section of the respective joint bar through the (reduced-thickness) central region between the two longitudinal sides of the respective joint bar thickened in this region, and extends into the region of the first end section of the subsequent joint bar through to the (reduced-thickness) central region between the two longitudinal sides of the subsequent joint bar thickened in this region.

In relation to a first broadside of the respective joint bar (e.g. upper side) and a second broadside of the respective joint bar (e.g. bottom side), the longitudinal sides of the respective joint bar may be thickened at only a single broadside. However, the longitudinal sides where they are thickened, preferably have a greater expanse in both directions parallel to the joint axis of the respective joint connection than at the in-between central region, i.e. the longitudinal sides of the respective joint bar are thickened at both broadsides of the respective joint bar. They therefore extend further in these two opposite directions than at the central region and thus protrude therefrom. Conversely, the central region corresponds to a thickness-reduced region between the two thickened longitudinal sides and is therefore recessed relative to the longitudinal sides, at least there where they are thickened. In other words, the respective joint bar may have a recess in the central region of at least one of the two opposite broadsides of the respective joint bar (respectively) which are orthogonal to the joint axis of the respective joint connection.

The combination of a thickness-reduced central region with thickened longitudinal sides of the respective joint bar advantageously leads to the respective joint bar requiring less material compared to a joint bar with a constant thickness, due to the thickness-reduced central region and therefore having less weight, and/or being more stable due to the thicker formed longitudinal sides. It is particularly advantageous that the longitudinal sides are thickened at least in the end sections, where a respective joint connection is provided. Despite the comparatively thinner joint bars, this special geometry prevents the joint connection between the joint bars from being accessible from the outside and thus being open to attack. As a result, the overall material required for the joint bar arrangement may be reduced while maintaining substantially the same level of protection against sawing, pinching or otherwise breaking-open of the joint connections. The reduced thickness of the central region also has the further advantage that openings, in particular for the joint connections, may be formed more easily, for example by punching or drilling.

According to an advantageous embodiment, the two longitudinal sides of the respective joint bar are thickened over its entire longitudinal extent. Correspondingly, the central region may have a reduced thickness along the entire longitudinal extent of the respective joint bar compared to the two longitudinal sides, i.e. a reduced expanse in a direction parallel to the joint axis of the respective joint connection. In this way, a reduction in material and weight while at the same time having reinforcement due to the thickened longitudinal sides is achieved not only in the end sections at which a respective joint connection is provided, but also in the central sections of the longitudinal extent of the respective joint bar, which due to the thickened longitudinal sides are particularly resistant to bending and torsion.

According to a further advantageous embodiment, each of the joint bars, where appropriate with the exception of the first joint bar and/or the last joint bar according to the sequence, has a cross-section with an H-shape, the rails of which correspond to the thickened longitudinal sides of the respective joint bar and the rung connecting the rails corresponds to the in-between central region of the respective joint bar.

The cross-section is orthogonal to the longitudinal extent of the respective joint bar. At least at the end sections of the respective joint bar and preferably over the entire longitudinal extent of the respective joint bar, the cross-section is preferably at least substantially constant, in particular (only) apart from openings through which a respective joint connection extends, and/or apart from the ends of the longitudinal extent which may be rounded. Preferably, the first joint bar and the last joint bar also have said cross-section, whereby here deviations from the otherwise preferred constant cross-section may arise, in particular due to the fact that the first end section of the first joint bar (housing bar) is configured for mounting to a lock body of the respective joint bar lock and/or that the last joint bar (locking bar) comprises at its second end section a locking recess for engaging with a latch for locking the last joint bar to the lock body and/or comprises a latching recess for latching to the lock body.

In particular, each of the joint bars, possibly with the exception of the first end section of the first joint bar according to the sequence and/or the second end section of the last joint bar according to the sequence, may have an H-shaped cross-section over its entire longitudinal extent, i.e. also at the axial end faces of the respective joint bar.

In some embodiments, the thicker formed longitudinal sides of the respective joint bar may extend in a straight line over the entire longitudinal extent of the joint bar.

In some embodiments, the joint bars, possibly with the exception of the first end section of the first joint bar and/or the second end section of the last joint bar according to the sequence, may have at the axial end faces with respect to their longitudinal extent the described thickened form only in the region of the longitudinal sides of the respective joint bar, while the central region of the respective joint bar lying between the longitudinal sides is also reduced in thickness at the axial end faces. Such an embodiment may simplify the manufacture of the joint bars, in particular by using a bar material that is formed (e.g. cold forming, such as cold rolling) according to the desired cross-sectional shape (e.g. H-shape).

According to an advantageous embodiment, each of the joint bars, possibly with the exception of the first joint bar and/or the last joint bar according to the sequence, comprises a metallic bar material. In particular, each of the joint bars may be formed from the metal bar material, however, this does not exclude the possibility that the joint bars are each completely or partially covered or enclosed by a coating, which may for example comprise a plastic material or be formed from a plastic. If such a coating is provided, this may remain unconsidered for said cross-section and for any possible present symmetries of a respective joint bar mentioned below.

The manufacture of a respective joint bar may include cutting the bar material to the desired longitudinal extent and punching and/or drilling the bar material to form additional structures, such as said openings for the joint connections, said locking recess and/or said latching recess. Preferably, the bar material already has said H-shaped cross-section, so that the thickened longitudinal sides and the comparatively thinner central region do not need to be formed first.

According to a further advantageous embodiment, each of the joint bars, possibly with the exception of the first joint bar and/or the last joint bar according to the sequence, is mirror-symmetrical with respect to a plane of symmetry parallel to the longitudinal extent and the transverse extent of the respective joint bar. Alternatively or additionally, each of the joint bars, possibly with the exception of the first joint bar and/or the last joint bar according to the sequence, may, according to a further advantageous embodiment, be mirror-symmetrical and/or rotationally-symmetrical with respect to an axis of symmetry orthogonal to the longitudinal extent and to the transverse extent of the respective joint bar. Such symmetries may in particular simplify the assembly of the joint bar arrangement.

Furthermore, it is advantageous if the joint bars, possibly with the exception of the first and/or last joint bar according to the sequence, are identical to each other. This may also simplify the assembly of the joint bar arrangement. This is also advantageous in terms of an efficient manufacture of the joint bars.

In particular, the joint connections may be formed as rivet joints. Therefore, according to a further advantageous embodiment, each of the joint connections, which couples a respective joint bar to a subsequent joint bar according to the sequence, comprises a rivet element which extends along the joint axis of the respective joint connection through an opening formed in the central region of the second end section of the respective joint bar and through an opening formed in the central region of the first end section of the subsequent joint bar.

The rivet element may have an increased diameter at both ends of its extent in a manner generally known, which has been brought about by plastic deforming at at least one of the two ends to produce the rivet joint. The increased diameters form rivet heads of the rivet element which extend along the joint axis of the respective joint connection in which the respective rivet head is located, and preferably do not extend over the thickened longitudinal sides on both sides of the central region. As a result, the thickened longitudinal sides hinder the applying of a saw, chisel or the like below the respective rivet head, which contributes to the breaking-open protection of the respective joint bar lock.

It is also preferable, for the respective joint connection to also comprise a disk element which is arranged between the two joint bars, i.e. the respective joint bar and the subsequent joint bar according to the sequence, and extends around the rivet element. For this purpose, the disk element advantageously has a central opening and with this opening is preferably arranged coaxially to said openings in the central region of the second end section of the respective joint bar or in the central region of the first end section of the subsequent joint bar. Due to the central opening, the disk element has a ring-shaped structure and may in particular be formed at least substantially like a washer.

Generally, the disk element and the rivet element may also be configured as a single-piece. However, a separate design is advantageous, particularly with regard to ease of manufacture.

According to a further advantageous embodiment, the disk element has a flat section in particular ring-shaped, and a bead section in particular ring-shaped which is arranged radially within the flat section with respect to the joint axis and which extends further than the flat section in at least one of the two directions parallel to the joint axis. In other words, the bead section extends axially to the joint axis beyond the flat section, preferably on both sides. In particular, the bead section may thus have a greater expanse in the direction parallel to the joint axis than the flat section, which preferably has an at least substantially constant expanse in this direction. Preferably, the bead section extends further than the flat section in both opposite directions parallel to the joint axis of the respective joint connection. As a result, the disk element is thickened in the radially inner bead section than in the radially outer flat section.

In particular, the bead section may be a radially innermost section of the disk element that is adjacent to said central opening. In particular, the flat section may be a radially outermost section of the disk element. Furthermore, the flat section and the bead section may be directly adjacent to each other radially.

The bead section does not necessarily have to have a constant axial expanse (i.e. an expanse in a direction parallel to the joint axis). In particular, how far and/or in which axial direction(s) the bead section extends beyond the flat section may vary in the circumferential direction around the joint axis. For example, the bead section may protrude beyond the flat section circumferentially, alternating in one axial direction and in the other. For example, such a disk element may be produced by pressing a radially inner section of an initial continuous flat disk element sector-by-sector alternately in one axial direction and in the other to form the bead section, thereby bending it out of the plane of the flat section. Such forming may be carried out by means of appropriate dies, for example. This type of design makes it comparatively easy to produce the bead section.

Due to the fact that the disk element extends around the rivet element means that it protects the rivet element, in particular the central part of the rivet element extending between the respective joint bar and the subsequent joint bar, from the employment of a prying tool as it makes it more difficult to access the rivet element. With regard to a particularly reliable protection, it is advantageous if the disk element is made of a hardened metal.

According to a further embodiment, it is further advantageous if an outer diameter of the flat section corresponds at least substantially to the expanse of the respective joint bar parallel to its transverse extent and/or the expanse of the subsequent joint bar parallel to its transverse extent. In particular, the outer sides of the disk elements may be arranged at least substantially flush with the longitudinal sides of the joint bars. For example, the flat section may extend radially at least as far as between the thickened longitudinal sides of the respective joint bar and the thickened longitudinal sides of the subsequent joint bar—in particular in such a way that the flat section (apart from a certain amount of clearance to prevent jamming) is in contact with the thickened longitudinal sides of the respective joint bar at a first axial side and is in contact with the thickened longitudinal sides of the subsequent joint bar at a second axial side opposite the first axial side. As a result, the disk elements may also help to ensure that two joint bars coupled to one another via a respective joint connection may move comparatively easily relative to one another during pivoting since they do not rub directly against one another with differently rounded surfaces of their thickened longitudinal sides, but rather each slide along one of the two opposite axial sides of the flat section of the disk element of the respective joint connection. In particular, for this purpose, the axial sides of the flat section of the disk elements (i.e. pointing in a direction parallel to a respective joint axis of the respective joint connection) are preferably flat (with the surface oriented perpendicular to the joint axis) and ideally smooth.

The design possibilities described further contribute to a compact structure of the joint bar arrangement. If the joint bar arrangement is folded together like a yardstick as a kind of compact package, this package is also substantially tightly closed on the outside, particularly in the region of the joint connections, since the spaces between the coupled together end sections of the joint bars are largely filled by the disk elements. This results in a further advantage of improved security against attempts to bend open the joint connections using the joint bars as a lever.

In addition or as an alternative to the above embodiment, it is advantageous if, according to a further embodiment, an outer diameter of the bead section corresponds at least substantially to the expanse of the central region of the respective joint bar and/or the central region of the subsequent joint bar along the transverse direction or is smaller than this expanse. In other words, the outer diameter of the bead section may correspond to the distance between the two thickened longitudinal sides of the respective joint bar parallel to its transverse extent and/or the distance between the two thickened longitudinal sides of the subsequent joint bar parallel to its transverse extent or may be smaller than this respective distance. In this way, the bead section may engage between the two thickened longitudinal sides of the respective joint bar or between the two thickened longitudinal sides of the subsequent joint bar. This results in an interlacing geometry that protects said central part of the rivet element particularly reliably against access from the outside.

Furthermore, according to a further embodiment, it is advantageous when the expanse of the bead section in the direction parallel to the joint axis is greater than the distance (the maximum possible distance due to the respective joint connection) along the joint axis between the thickened longitudinal sides of the respective joint bar and the thickened longitudinal sides of the subsequent joint bar. Due to such a design, inevitably the bead section substantially engages between the two thickened longitudinal sides of at least one of the two joint bars, preferably both joint bars. As a result, it even more difficult to penetrate said interlacing geometry.

Overall, the disk element may thereby largely fill the space between two joint bars coupled together by a respective joint connection in the region around the respective joint connection due to the described design of its flat section and bead section. This helps to stabilize the joint connection and reliably protect it against access from the outside.

The joint bar lock according to the invention may in particular be configured as a joint bar lock for a two-wheeler and comprise a lock body and a joint bar arrangement according to the invention which can be locked to the lock body, and in particular may be configured in one of the ways described above. The advantages of the joint bar arrangement according to the invention, in particular the high level of protection against being broken-open despite having an advantageous reduction in material and weight, are then also given for the joint bar lock.

According to an advantageous embodiment, the joint bar arrangement may be locked to the lock body in that the lock body comprises a locking receiver which is configured to receive the second end section of the last joint bar of the joint bar arrangement, and also comprises a locking mechanism by means of which the second end section of the last joint bar can be secured against leaving the locking receiver. In this respect, the second end section of the last joint bar concerns a locking section of the joint bar arrangement.

According to a further advantageous embodiment, the second end section of the last joint bar comprises a locking recess which extends in the central region of the last joint bar orthogonal to the longitudinal extent and to the transverse extent of the last joint bar, preferably it extends through the central region so that a latch of the locking mechanism may engage in the locking recess, in particular may engage through the locking recess, and may thereby secure the second end section (received in the locking receiver) against leaving the locking receiver. It is preferable for the locking recess to have a greater expanse along the longitudinal extent of the last joint bar than along the transverse extent of the last joint bar. In particular, the locking recess may be formed as an elongated slot. In particular, the shape of the locking recess may be at least substantially rectangular.

Furthermore, it is preferred that the latch is formed by a section of a latch plate which is folded around a folded edge and is thus at least double-layered, whereby the folded edge is oriented parallel to the longitudinal extent of the last joint bar when the second end section of the last joint bar is received in the locking receiver. Such a latch is comparatively easy and inexpensive to manufacture. However, it has been shown that despite its simple design, the latch is surprisingly stable due to its double-layer and said orientation of the folding edge, and in particular, it may withstand large shear forces along the longitudinal extent of the last joint bar such as may occur when an attempt is made to pull the second end section of the last joint bar out of the locking receiver.

Furthermore, it is particularly advantageous when the locking mechanism is so formed that the latch engages in the locking recess with the folded edge leading, for when it secures the second end section of the last joint bar against leaving the locking receiver. This is because the curved shape of the folded edge can make it easier for the latch to engage precisely in the locking recess. In addition, the two layers of the latch are then connected to each other via the folded edge in the region of engagement and are therefore arranged particularly stable to each other.

According to a further advantageous embodiment of the joint bar arrangement or the joint bar lock, the second end section of the last joint bar comprises a latching recess which extends from an axial end face with respect to the longitudinal extent of the last joint bar, along the longitudinal extent into the second end section. In particular, in comparison to a latching recess formed in one of the broad sides perpendicular to the joint axes of the joint connections, such a latching recess provided at the axial end face may be formed comparatively easy, for example by punching.

It is further advantageous, when an entry section of the latching recess, with which the latching recess merges onto the axial end face, is narrower than a receiving section of the latching recess that lies further inward with respect to the longitudinal extent of the last joint bar, i.e. it has a smaller expanse along the transverse extent of the last joint bar than the receiving section. According to an advantageous further development of this embodiment, an elastic latching element, in particular made of a plastic, may then be formed at the lock body, which, when the second end section of the last joint bar is received in the locking receiver, engages in the latching recess parallel to the longitudinal extent of the last joint bar, i.e. frontal, and preferably (ultimately) engages behind the narrowed entry section in order to hold the second end section in the locking receiver. In this way, it is advantageously prevented that the second end section received in the locking receiver can fall uncontrolled out of the locking receiver, even if it is not yet blocked by the latch from leaving the locking receiver. In this way, the latching element may also be regarded as part of the locking mechanism.

The elastic latching element may, for example, comprise two latching tongues which in a rest position extend at least substantially parallel to each other from one end at which they are mounted, in particular to a lock housing or an internal housing of the lock body of the respective lock, to a free end, and at their free end each latching tongue has a latching lug, wherein the latching lugs of the two latching tongues are oriented pointing away from each other. In particular, the latching tongues may be formed as a single-piece with an internal housing of the lock body, which may comprise a plastic material. From their rest position, the latching tongues may be elastically deflectable towards each other so that the latching lugs can pass through the narrowed entry section of the latching recess when the second end section of the last joint bar is inserted into the locking receiver and the latching tongues may then spring back in the receiving section of the latching recess towards their rest position, so that the latching lugs engage behind the entry section and thereby hold the second end section of the last joint bar in the locking receiver.

Furthermore, the invention relates in general, independent of the joint bar arrangements and the joint bar locks described above, to a joint bar arrangement for a joint bar lock comprising a plurality of joint bars serially connected to each other according to a defined sequence, including a first joint bar according to the sequence and a last joint bar according to the sequence, wherein each of the joint bars extends along a longitudinal extent from a first end section to a second end section, wherein each of the joint bars, with the exception of the first joint bar, is coupled by its first end section via a respective joint connection to the second end section of the joint bar preceding it according to the sequence and in such a way that it is pivotable relative to the preceding joint bar about a joint axis of the respective joint connection which is orthogonal to its longitudinal extent, wherein the second end section of the last joint bar comprises a locking recess which has a greater expanse along the longitudinal extent of the last joint bar than along a transverse extent of the last joint bar orthogonal to the longitudinal extent and to the joint axis of the joint connection coupling the last joint bar to the preceding joint bar. The joint bar arrangement and its elements may also be configured in one of the ways described above, insofar as this is applicable.

Furthermore, the invention relates in general, independent of the joint bar arrangements described above and the joint bar locks described above, to a lock, in particular a two-wheeler lock, having a lock body and a locking element which can be locked to the lock body, in that the lock body comprises a locking receiver which is configured to receive a locking section of the locking element, and also comprises a locking mechanism, by means of which the locking section may be secured against leaving the locking receiver, wherein the locking section comprises a locking recess so that a latch of the locking mechanism may engage in the locking recess and thereby secure the locking section against leaving the locking receiver, wherein the latch is formed by a section of a latch plate which is folded around a folded edge and is thereby at least double-layered. Preferably, when the locking section is received in the locking receiver, the folded edge is oriented parallel to a longitudinal extent of the locking section or to an insertion direction in which the locking section may be inserted into the locking receiver. Furthermore, it is preferred that the locking mechanism is configured such that the latch engages in the locking recess with the folded edge leading, when it secures the locking section against leaving the locking receiver. The locking element may, for example, be configured as a joint bar arrangement according to the invention, in particular according to one of the ways described above. Otherwise, the lock and its elements may also be configured in one of the ways described above, insofar as this is applicable.

Furthermore, the invention relates in general, independent of the joint bar arrangements described above and the joint bar locks described above, to a lock, in particular a two-wheeler lock, having a lock body and a locking element which can be locked to the lock body in that the lock body comprises a locking receiver which is configured to receive a locking section of the locking element, and also comprises a locking mechanism by means of which the locking section can be secured against leaving the locking receiver, wherein the locking section comprises a latching recess which extends in the locking section from an axial end face of the locking section, with which the locking section can be inserted into the locking receiver first. In particular, the axial end face may be oriented perpendicular to an insertion direction in which the locking section can be inserted into the locking receiver. In particular, the latching recess may extend into the locking section parallel to this insertion direction. Furthermore, an entry section of the latching recess, with which the latching recess merges onto the axial end face, may be narrowed compared to a receiving section of the latching recess lying behind it, i.e. with respect to said insertion direction lying further within the locking section. The locking mechanism preferably comprises an elastic latching element, in particular made of plastic, which, when the locking section is received in the locking receiver, in particular parallel to said insertion direction, engages in the latching recess and preferably engages behind the narrowed entry section in order to hold the second end section in the locking receiver. The elastic latching element may comprise two latching tongues which, in a rest position, extend at least substantially parallel to one another from an end at which they are mounted, in particular to a lock housing or an internal housing of the lock body of the respective lock, to a free end, and at its free end each latching tongue comprises a latching lug, wherein the latching lugs of the two latching tongues are oriented preferably pointing away from one another. In particular, the latching tongues may be formed as a single-piece with an internal housing of the lock body, which may comprise a plastic material. From their rest position, the latching tongues may be elastically deflectable towards each other so that the latching lugs may pass through the narrowed entry section of the latching recess when the locking section is inserted into the locking receiver, and the latching tongues may then spring back towards their rest position in the receiving section of the latching recess, so that the latching lugs engage behind the entry section and thereby hold the locking section in the locking receiver. The lock and its elements may also be configured in one of the ways described above, if applicable.

DRAWINGS

The invention is explained further below merely by way of example with reference to the figures.

Figure 1:
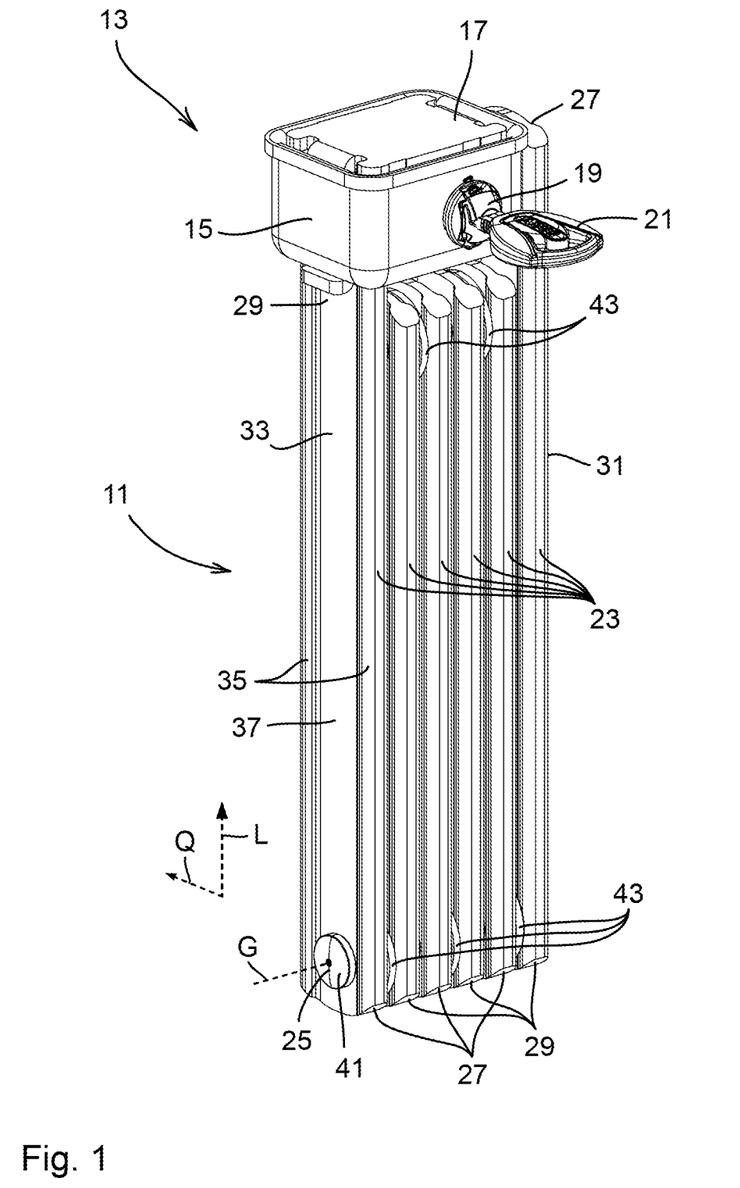
FIG. 1 shows an embodiment of a joint bar lock according to the invention, which comprises a joint bar arrangement according to the invention.
Figure 4:
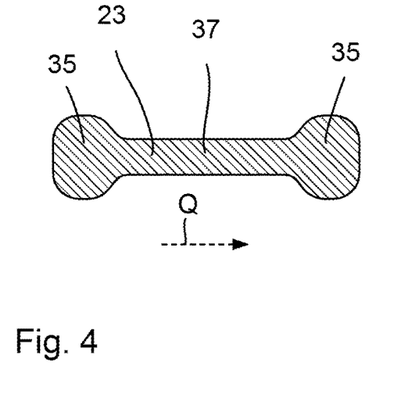
FIG. 4 shows a cross-section through a joint bar of the joint bar arrangement.
Figure 5:
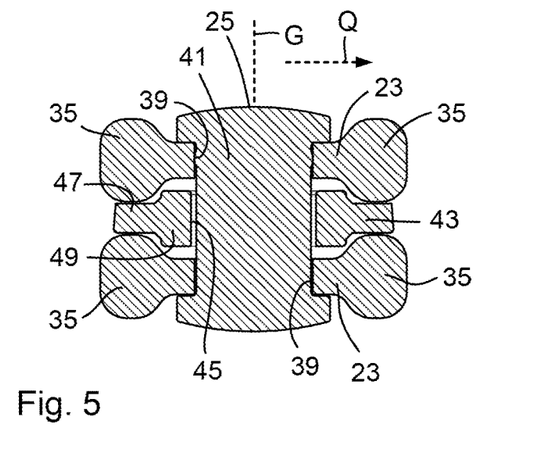
FIG. 5 shows a cross-section through a joint connection of the joint bar arrangement.
Figure 6:
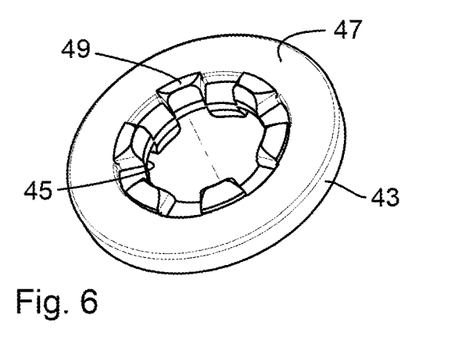
FIG. 6 shows an alternative possibility of forming a disk element of the joint bar arrangement.
Figure 7:
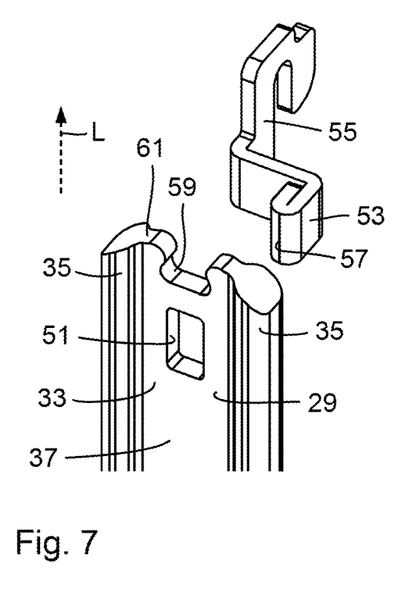
FIG. 7 shows the second end section of the last joint bar of the joint bar arrangement together with a latching plate, one section of which forms a latch of a locking mechanism of the joint bar lock.
Figure 8:
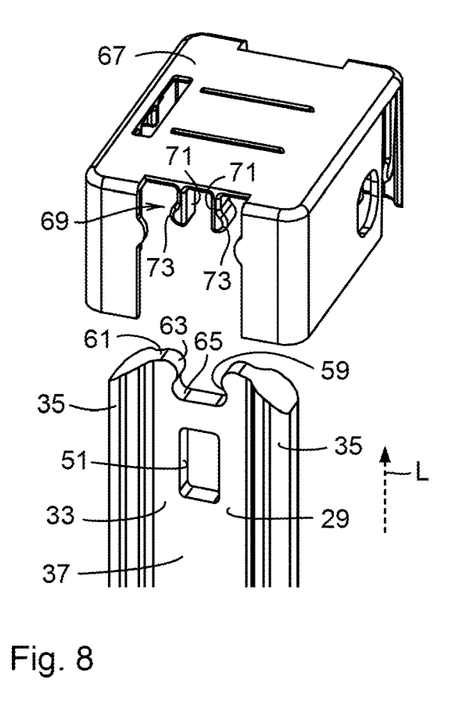
FIG. 8 shows the second end section of the last joint bar of the joint bar arrangement together with an internal housing of the joint bar lock, at which a latching element is formed.

The figures show an exemplary embodiment of a joint bar arrangement 11 according to the invention and a joint bar lock 13 according to the invention having a joint bar arrangement 11 according to the invention. FIG. 1 shows the joint bar lock 13 as a whole and FIG. 2 shows the joint bar arrangement 11 as a whole, while FIGS. 4 and 5 show cross-sections, FIG. 6 shows a disk element 43 as an individual part and FIGS. 7 and 8 show details of the joint bar arrangement 11 and the joint bar lock 13.

As can be seen in FIG. 1, the joint bar lock 13 comprises a lock body 15 and the joint bar arrangement 11. The lock body 15 comprises a lock housing 17, which bounds the lock body 15 outwardly and in which a locking mechanism 19 is accommodated, and which comprises a lock cylinder that may be actuated by means of a key 21, of which in FIG. 1 only a part can be seen protruding slightly from the lock housing 17.

Figure 2:
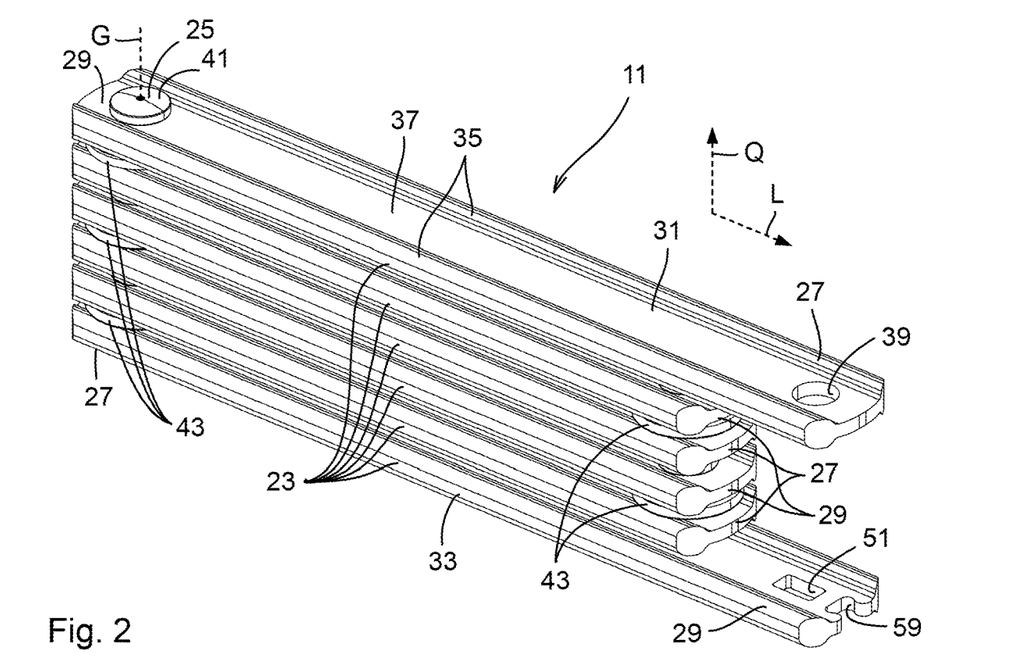
FIG. 2 shows the joint bar arrangement in a specific representation.

As can be seen in particular in FIG. 2, the joint bar arrangement 11 comprises a plurality of joint bars 23, which are connected to one another in series according to a defined sequence via joint connections 25. Each of the joint bars 23 extends along a respective longitudinal extent L (the orientation of the longitudinal extent L is respectively shown in the figures) from a first end section 27 to a second end section 29.

A first joint bar 31 according to the sequence functions as a housing bar which is firmly and permanently mounted to the lock housing 17 by its first end section 27 via a rivet joint, while a last joint bar 33 according to the sequence functions as a locking bar whose second end section 29 may be inserted into a locking receiver of the lock body 15 in order to lock the joint bar lock 13 (cf. the locked state of the joint bar lock 13 shown in FIG. 1), and may be secured against leaving the locking receiver by means of the locking mechanism 19. In this respect, the second end section 29 of the last joint bar 33 forms a locking section of the last joint bar 33.

Due to their respective special function, the first joint bar 31 and the last joint bar 33 differ from the other joint bars 23 which are formed identical. Therefore, the other joint bars 23 also have the same length respectively (expanse along the longitudinal extent L), whereas in comparison, the first longitudinal bar 31 and the last joint bar 33 have a greater length respectively.

Each of the joint connections 25 couples the first end section 27 of a respective joint bar 23 to the second end section 29 of the joint bar 23 preceding the respective joint bar 23 according to the sequence, or couples the second end section 29 of a respective joint bar 23 to the first end section 27 of the subsequent joint bar 23 according to the sequence. In each case, the coupling is such that the two joint bars 23 coupled by the respective joint connection 25 are pivotable relative to each other about a joint axis G of the respective joint connection 25 orthogonal to the respective longitudinal extent L of the two joint bars 23. The joint axes G of the joint connections 25 are always oriented at least substantially parallel to one another. Within the context of their relative pivotability to one another, the joint bars 23 may be arranged in particular in the manner shown in FIGS. 1 and 2, in which they are folded together like a yardstick, for storage or transportation of the joint bar lock 13, for example. The joint bars 23 of the joint bar arrangement 11 are then oriented with their respective longitudinal extent L parallel to each other, so that overall a particularly compact folded package results.

Each of the joint bars 23 is bound by two opposite longitudinal sides 35 with respect to a transverse extent Q (of which only the direction is shown in the figures) orthogonal to its longitudinal extent L and to the joint axes G of the joint connections 25. The longitudinal sides 35 each have a straight contour and are oriented parallel to the longitudinal extent L of the respective joint bar 23. With respect to a direction parallel to the joint axes G of the joint connections 25, the two longitudinal sides 35 have a greater expanse over the entire longitudinal extent L of the respective joint bar 23 than a central region 37 of the respective joint bar 23 lying between the two longitudinal sides 35 and having a constant thickness (expanse parallel to the joint axes G) and extends over the entire longitudinal extent L of the respective joint bar 23. The two longitudinal sides 35 are thus thickened relative to said central region 37. In particular, each of the two longitudinal sides 35 are also thickened in the first end section 27 and in the second end section 29 of the respective joint bar 23 with respect to the central region 37 lying in-between.

The two longitudinal sides 35 extend beyond the central region 37 in both opposite directions parallel to the joint axes G and thus protrude over the central region 37 on both sides. As a result, each of the joint bars 23 has the cross-section shown in FIG. 4 over its entire length (and also at its axial end faces), which has an H-shape and is at least substantially constant over the entire longitudinal extent L of the respective joint bar 23. The rails of the H-shape correspond to the thickened longitudinal sides 35 of the respective joint bar 23, while the rung of the H-shape connecting the rails corresponds to the in-between central region 37 of the respective joint bar 23. There are deviations from the constant cross-section essentially only insofar as the ends of the joint bars 23 are somewhat rounded in the plan-view and openings 39 for the joint connections 25 are formed in the end sections 27, 29 of the joint bars 23 (see FIGS. 3 and 5); a corresponding opening 39 for the rivet joint to the lock body 15 is also formed in the first end section 27 of the first joint bar 31 (see FIG. 2), and a locking recess 51 and a latching recess 59 are formed in the second end section 29 of the last joint bar 33 (see FIGS. 2, 7 and 8), which will be described below.

The joint bars 23 may be formed from a bar material that already has said cross-section. The production is then especially simple, since the bar material only has to be cut to the length of the longitudinal extent L of the respective joint bar 23 and said openings 39 or recesses 51, 59 have to be formed, whereby this may be carried out in a simple manner by punching. The punching step is further simplified by the fact that the central region 37 of the respective joint bar 23 has a reduced thickness compared to the longitudinal sides 35.

In addition, all joint bars 23 are mirror-symmetrical with respect to a plane of symmetry orthogonal to the joint axes G of the joint connections 25, in particular due to the symmetrical H-shape of the cross-section. With the exception of the last joint bar 33, the joint bars 23 are also mirror-symmetrical with respect to a plane of symmetry orthogonal to the longitudinal extent L of the respective joint bar and are mirror-symmetrical and rotationally-symmetrical with respect to an axis of symmetry parallel to the joint axes G of the joint connections 25.

Figure 3:
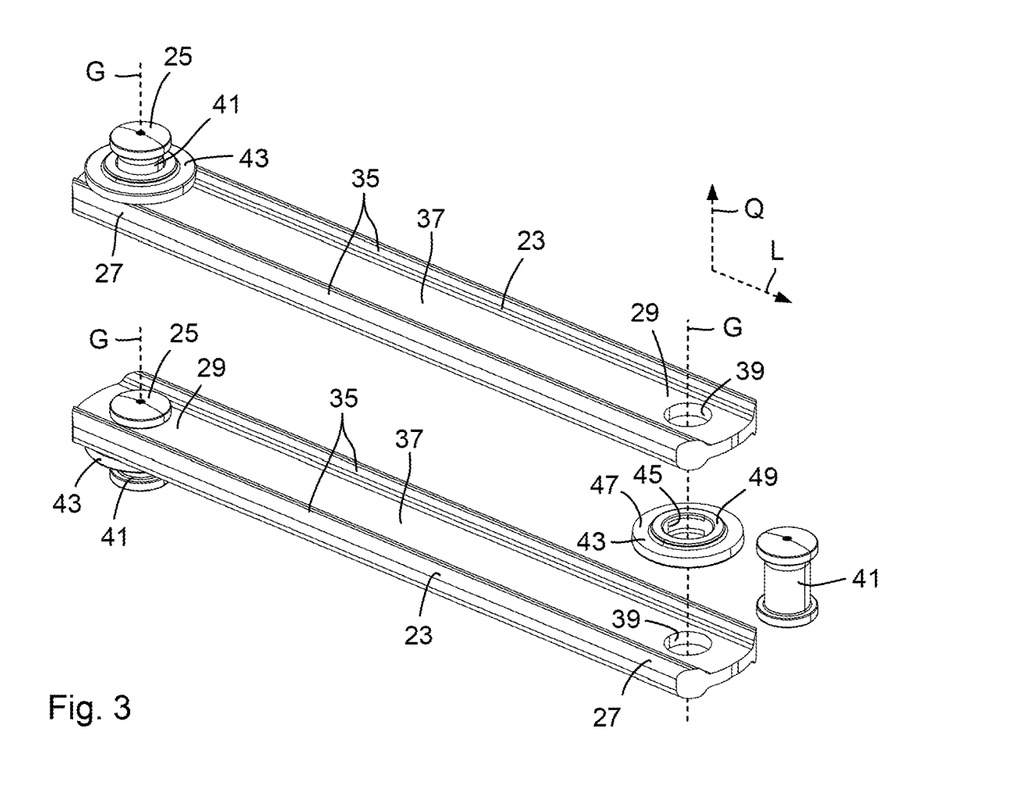
FIG. 3 shows parts of the joint bar arrangement partially detached from each other.

As can be seen in particular in FIG. 3 and in the sectional view of FIG. 5, each of the joint connections 25 comprises a rivet element 41 which extends along the joint axis G of the respective joint connection 25 through said opening 39 formed in the central region 37 of the respective end section 27, 29 of the respective joint bar 23 and whose ends comprise rivet heads, in the usual manner for a rivet joint, with an increased diameter compared with a central part of the rivet element 41, in order to couple the two respective joint bars 23 securely to one another. Each of the joint connections 25 further comprises a disk element 43 which is arranged between the two joint bars 23 and extends around the rivet element 41. The rivet element 41 thus extends not only through the opening 39 in the central region 37 of the second end section 29 of the respective joint bar 23 and through the opening 39 in the central region 37 of the first end section 27 of the subsequent joint bar 23, but also through a central opening 45 in the disk element 43 of the respective joint connection 25.

The disk element 43 comprises a respective flat section 47 and bead section 49 arranged axially within the flat section 47 with respect to the joint axis G of the respective joint connection 25, said bead section 49 has a greater expanse in the direction parallel to the joint axis G than the flat section 47. The bead section 49 adjoins said central opening 45 on the one hand and the flat section 47 on the other hand, and extends beyond the flat section 47 in both opposite directions parallel to the joint axis G, so that the disk element 43 has on its two sides a ring-shaped circumferential bead on its inner circumference around the central opening 45.

As can be understood in particular from the cross-section through one of the joint connections 25 shown in FIG. 5, the outer diameter of the bead section 49 corresponds at least substantially to the expanse of the central region 37 of the respective joint bar 23 and the expanse of the central region 37 of the subsequent joint bar 23 along the transverse direction Q, and the expanse of the bead section in a direction parallel to the joint axis G of the respective joint connection 25 is greater than the distance along the joint axis G between the thickened longitudinal sides 35 of the respective joint bar 23 on the one hand and the thickened longitudinal sides 35 of the subsequent joint bar 23 on the other hand. As a result, on both sides of the disk element 43, the bead section 49 engages between the longitudinal sides 35 of both the one and the other of the two joint bars 23.

With its flat section 47, the disk element 43 extends radially as far as between the thickened longitudinal sides 35 of the two joint bars 23, so that it is substantially flush with the longitudinal sides 35 of both joint bars 23. Overall, the disk element 43 with its flat section 47 and its bead section 49 thus largely fills the space between the two joint bars 23 in the area around the respective joint connection 25.

The resulting interlacing geometry thus advantageously reliably shields the rivet element 41, in particular its central part with respect to the joint axis G, against any access by means of a prying tool between the two joint bars 23. Furthermore, by said filling of the available space, the disk elements 43 provide additional protection against two joint bars 23, coupled via a respective joint connection 25, being used as a lever to bend open the joint connection 25. Ultimately, the disk elements 43 are also advantageous in that their flat sections 47 provide sliding surfaces on which the thickened longitudinal sides 35 may slide along more easily than sliding against each other, so that the joint bars 23 may be pivoted relative to one another with particular ease.

According to FIGS. 3 and 5, both the flat section 47 and also the bead section 49 of the disk elements 43 each have a constant axial expanse (i.e. an expanse parallel to the joint axis G of the respective joint connection 25). However, this is not necessarily the case in particular for the bead section 49 as shown in FIG. 6, which shows an example of an alternative possibility for forming the disk elements 43. In this embodiment, the bead section 49 is formed by the material of the disk element 43 being bent out from the plane of the flat section 47 in the axial direction. The ring shape of the bead section 49 is divided into a plurality of sectors (in the example shown: twelve), which are bent alternately in the one or the other of the two opposite directions parallel to the joint axis G of the respective joint connection 25. As a result, the bead section 49 protrudes from the flat section 47 alternately with a respective one of the sectors in one axial direction or in the other axial direction opposite thereto. Even with such a configuration, the bead section 49 may engage on both sides of the disk element 43 between the longitudinal sides 35 of both the one and the other of the two joint bars 23 coupled to each other via the respective joint connection 25, resulting in an advantageous interlacing geometry by which the rivet element 41 is protected against being accessed from the outside.

As can be seen in particular in FIG. 7, the second end section 29 of the last joint bar 33 comprises a locking recess 51 which extends through the central region 37 of the second end section 29 in a similar way to said openings 39. However, unlike the round openings 39, the locking recess 51 has an elongated rectangular shape which is oriented parallel to the longitudinal extent L of the last joint bar 33. Said locking mechanism 19 of the lock body 15 of the joint bar lock 13 comprises a latch 53 which, when the second end section 29 of the last joint bar 33 is received in said locking receiver of the lock body 15, may engage in the locking recess 51 in order to block the second end section 29 from leaving the locking receiver.

The latch 53 is formed by a section of a latch plate 55, which is folded around a folded edge 57 and is thus double-layered. The latch 53 is arranged and oriented such that it engages in the locking recess 51 with the folded edge 57 leading when it secures the second end section 29 of the last joint bar 33 against leaving the locking receiver, and that the folded edge 57 is oriented parallel to the longitudinal extent L of the last joint bar 33.

In particular, as can be seen in FIG. 8, the second end section 29 of the last joint bar 33 also has a latching recess 59 which extends from an axial end face 61 with respect to the longitudinal extent L of the last joint bar 33, along the longitudinal extent L into the second end section 29. An entry section 63 of the latching recess 59, with which the latching recess 59 merges at the axial end face 61, is narrowed compared with a receiving section 65 of the latching recess 59 located further inwards with respect to the longitudinal extent L of the last joint bar 33.

Furthermore, an internal housing 67 of the lock body 15 formed from plastic comprises a latching element 69 which, when the second end section 29 of the last joint bar 33 is received in the locking receiver, engages in the latching recess 59 parallel to the longitudinal extent L of the last joint bar 33, and thereby holds the second end section 29 in the locking receiver. The latching element 69 comprises two latching tongues 71 which, in a rest position, extend at least substantially parallel to one another from one end at which they transition into the internal housing 67 with which they are integrally formed, to a free end at which they each have a latching lug 73 which protrudes from the remaining respective latching tongue 71. The latching lugs 73 of the two latching tongues 71 point away from each other.

From their rest position shown in FIG. 8, the latching tongues 71 may be elastically deflected towards each other so that the latching lugs 73 may pass through the narrowed entry section 63 of the latching recess 59 and reach the wider receiving section 65 of the latching recess 59 when the second end section 29 of the last joint bar 33 is inserted into the locking receiver. There, the latching tongues 71 move away from each other again towards their respective rest position due to their elasticity, so that the latching lugs 73 engage behind the narrowed entry section 63 and thus hold the second end section 29 of the last joint bar 33 in the locking receiver.

What is claimed is:

1. A joint bar arrangement for a joint bar lock, comprising:
a plurality of joint bars serially connected to one another according to a defined sequence, including a first joint bar and a last joint bar according to the defined sequence,
wherein each of the joint bars extends along a longitudinal extent from a respective first end section to a respective second end section,
wherein each of the joint bars, with the exception of the last joint bar, is coupled by a respective joint connection between the respective second end section to the respective first end section of the joint bar that follows according to the sequence,
wherein each joint bar is pivotable, about a joint axis of the respective joint connection that is orthogonal to the longitudinal extent of the joint bar, relative to the joint bar that follows,
wherein each of the joint bars is bound, with respect to a transverse extent orthogonal to the longitudinal extent of the joint bar and to the joint axis of the respective joint connection, by two opposite longitudinal sides extending longitudinally along the longitudinal extent of the joint bar,
wherein, for each joint bar that is not the first joint bar, the two opposite longitudinal sides are thickened in the entire respective first end section and,
wherein, for each joint bar that is not the last joint bar, the two opposite longitudinal sides are thickened in the entire respective second end section,
wherein, in each of the first and second end sections having longitudinal sides that are thickened, said opposite longitudinal sides are thickened to have a greater expanse in a direction parallel to the joint axis of the respective joint connection relative to an expanse in the direction parallel to the joint axis of a central region of the respective joint bar, wherein the central region extends transversely and laterally between the opposite longitudinal sides.

2. The joint bar arrangement according to claim 1, wherein the two longitudinal sides of the respective joint bar are thickened over an entire longitudinal extent of the respective joint bar.

3. The joint bar arrangement according to claim 1, wherein each of the joint bars, at least each of those that are not the first or the last joint bar, has a cross-section having an H-shape with rails connected by a rung, wherein the rails correspond to the thickened longitudinal sides of the respective joint bar and the rung connecting the rails corresponds to the central region of the respective joint bar.

4. The joint bar arrangement according to claim 3, wherein each of the joint bars, at least each of those that are not the first or the last joint bar, has the H-shaped cross-section over an entire longitudinal extent of the respective joint bar.

5. The joint bar arrangement according to claim 1, wherein each of the joint bars, at least each of those that are not the first or the last joint bar, comprises a metallic bar material.

6. The joint bar arrangement according to claim 1, wherein each of the joint bars, at least each of those that are not the first or the last joint bar, is mirror-symmetrical with respect to a plane of symmetry parallel to the longitudinal extent and to the transverse extent of the respective joint bar.

7. The joint bar arrangement according to claim 1, wherein each of the joint bars, at least each of those that are not the first or the last joint bar, is mirror-symmetrical and/or rotationally-symmetrical with respect to an axis of symmetry orthogonal to the longitudinal extent and to the transverse extent of the respective joint bar.

8. The joint bar arrangement according to claim 1, wherein each of the respective joint connections comprises a rivet element which extends along the joint axis of the respective joint connection through an opening formed in the central region of the second end section of the respective joint bar and through an opening formed in the central region of the first end section of the joint bar that follows, and comprises a disk element which is arranged between the joint bar and the joint bar that follows and extends around the rivet element, wherein the disk element comprises a flat section and a bead section arranged radially within the flat section with respect to the joint axis and which extends further than the flat section in at least one of the two directions parallel to the joint axis.

9. The joint bar arrangement according to claim 8, wherein an outer diameter of the flat section corresponds to the expanse of the respective joint bar parallel to the transverse extent of the respective joint bar and/or to the expanse of the joint bar that follows parallel to the its transverse extent of the joint bar that follows.

10. The joint bar arrangement according to claim 8, wherein an outer diameter of the bead section corresponds to or is smaller, along the transverse direction, than the expanse of the central region of the respective joint bar and/or the expanse of the central region of the joint bar that follows.

11. The joint bar arrangement according to claim 8, wherein the expanse of the bead section in a direction parallel to the joint axis is greater than the distance, along the joint axis, between the thickened longitudinal sides of the respective joint bar and the thickened longitudinal sides of the joint bar that follows.

12. The joint bar arrangement according to claim 1, wherein the second end section of the last joint bar includes a latching recess which extends from an axial end face with respect to the longitudinal extent of the last joint bar, along the longitudinal extent into the second end section.

13. The joint bar arrangement according to claim 1 installed in a joint bar lock, wherein the joint bar arrangement is configured to be locked to a lock body of the joint bar lock.

14. The joint bar arrangement according to claim 13, wherein the joint bar arrangement is configured to be locked to the lock body wherein the lock body comprises a locking receiver which receives the second end section of the last joint bar of the joint bar arrangement, and wherein the lock body also comprises a locking mechanism, wherein the second end section of the last joint bar is secured against removal from the locking receiver by the locking mechanism.

15. The joint bar arrangement according to claim 14, wherein the second end section of the last joint bar comprises a locking recess which extends in the central region of the last joint bar orthogonal to the longitudinal extent and to the transverse extent of the last joint bar, wherein a latch of the locking mechanism engages in the locking recess and secures the second end section against removal from the locking receiver.

16. The joint bar arrangement according to claim 15, wherein the latch is formed by a section of a latch plate which is folded around a folded edge and is at least double-layered, and wherein when the second end section of the last joint bar is received in the locking receiver, the folded edge is oriented parallel to the longitudinal extent of the last joint bar.

17. The joint bar arrangement according to claim 16, wherein, when the latch of the locking mechanism secures the second end section of the last joint bar against removal from the locking receiver, the latch engages in the locking recess with the folding edge leading.

18. The joint bar arrangement according to claim 13, wherein the second end section of the last joint bar comprises a latching recess which extends from an axial end face with respect to the longitudinal extent of the last joint bar, along the longitudinal extent into the second end section,
wherein an entry section of the latching recess, with which the latching recess opens into the axial end face, is narrowed relative to a receiving section of the latching recess lying further inwards with respect to the longitudinal extent of the last joint bar, and
wherein an elastic latching element is formed at the lock body, wherein when the second end section of the last joint bar is received in the locking receiver, the elastic latching element engages in the latching recess parallel to the longitudinal extent of the last joint bar and holds the second end section in the locking receiver.

19. A joint bar arrangement for a joint bar lock comprising:
a plurality of joint bars serially connected to one another, including a first joint bar, a last joint bar, and a plurality of intermediate joint bars arranged between the first joint bar and the last joint bar,
wherein each of the plurality of intermediate joint bars is formed as rectilinear along a longitudinal extent between two ends,
wherein each of the plurality of intermediate joint bars includes two longitudinal sides, which extend between the two ends and which are interconnected by an upper broad side and a lower broad side of the respective intermediate joint bar,
wherein each of the plurality of intermediate joint bars is coupled to a neighboring one of the plurality of joint bars via a respective pivot joint connection, the respective pivot joint connection having a joint axis which is orthogonal to the longitudinal extent of the respective intermediate joint bar,
wherein each of the plurality of intermediate joint bars, in a plane orthogonal to its longitudinal extent, has an H-shaped cross-section over its entire longitudinal extent, wherein the two longitudinal sides of each of the plurality of intermediate joint bars are thickened over the its entire longitudinal extent of the respective intermediate joint bar with respect to valley regions which are formed at the upper broad side and the lower broad side of the respective intermediate joint bar, over the entire longitudinal extent of the respective intermediate joint bar including the two ends.

20. A joint bar arrangement for a joint bar lock, comprising:
a plurality of joint bars serially connected to one another, including a first joint bar, a last joint bar, and a plurality of intermediate joint bars arranged between the first joint bar and the last joint bar,
wherein each of the plurality of intermediate joint bars extends along a longitudinal extent between a first end section and a second end section,
wherein each of the plurality of intermediate joint bars is coupled, by a respective joint connection that connects a respective first end section to a respective second end section of the intermediate joint bars, to a neighboring one of the plurality of joint bars, wherein the respective intermediate joint bar is pivotable relative to the neighboring joint bar about a joint axis which is orthogonal to the longitudinal extent of the respective intermediate joint bar,
wherein each of the plurality of intermediate joint bars has two opposite longitudinal sides along in the entire first end section and along in the entire second end section, wherein the two opposite longitudinal sides along each of the first and second end sections are elevated, relative to a central region extending between the two opposite longitudinal sides of the respective first or second end section, in at least one direction parallel to the joint axis of the respective joint connection, and wherein each of the respective joint connections includes a rivet which extends along the joint axis of the respective joint connection through an opening formed in the central region of the second end section of the respective intermediate joint bar and through an opening formed in the central region of the first end section of the neighboring joint bar, and wherein each of the respective joint connections includes a disk element that encircles the rivet and, wherein the disk element is arranged between the respective intermediate joint bar and the neighboring joint bar, wherein the disk element has a flat section and a projecting section arranged radially within the flat section with respect to the joint axis, wherein the projecting section projects over the flat section in at least one direction parallel to the joint axis.

* * * * *